United States Patent Office.

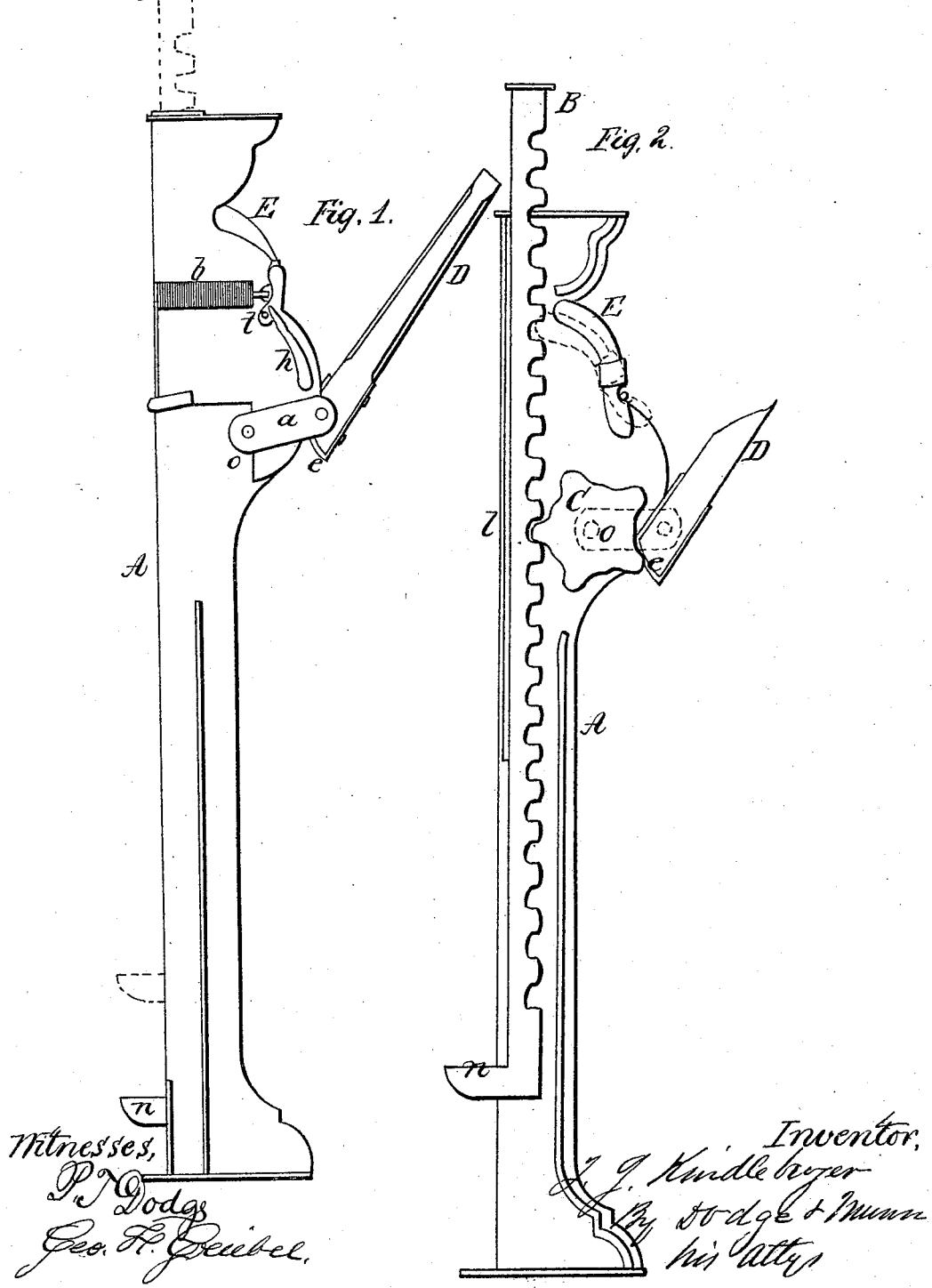

T. J. KINDLEBERGER, OF EATON, OHIO.

Letters Patent No. 71,183, dated November 19, 1867.

IMPROVEMENT IN LEVER-JACK.

*The Schedule referred to in these Letters Patent and making part of the same.*

TO ALL WHOM IT MAY CONCERN:

Be it known that I, T. J. KINDLEBERGER, of Eaton, in the county of Preble, and State of Ohio, have invented certain new and useful Improvements in Lever-Jacks; and I do hereby declare that the following is a full, clear, and exact description thereof, reference being had to the accompanying drawings, making part of this specification, and to the letters of reference marked thereon; like letters indicating like parts wherever they occur.

To enable others skilled in the art to construct and use my invention, I will proceed to describe it.

My invention consists in constructing a lever-jack with a hoisting-bar, having cogs on it, operated by a wheel, with a lever arranged to operate like a pawl and ratchet.

Figure 1 is a side elevation, and
Figure 2 is a vertical section.

I construct the frame A of cast iron, rectangular in its cross-section, and hollow or tubular, to receive the rack-bar B, the front wall or side of the frame A being left open for about one half its length, as represented in fig. 2, to permit the toe or hook, $n$, formed on the lower end of the rack-bar, to protrude through, as shown. The bar B, being inserted within the frame A, rests against the front wall $b$ thereof, as represented in fig. 2, and is held in place by a wheel, C, which is pivoted on a journal in the rear portion of the frame A. This wheel C has on its periphery a series of projections or cogs, properly arranged to engage with the teeth or cogs on the bar B, so that as the wheel C is rotated in one or the other direction the bar B will be raised or lowered. A lever, D, is then provided, having its inner end, $e$, bevelled, as shown, and is connected by links $a$, one on each side, to the journal of the wheel C, the lever being pivoted to the links $a$, near its end, as shown in fig. 1. By this arrangement of the lever and wheel, it will be seen that by lifting the lever up its end $e$ can be brought above, and permitted to rest upon one of the cogs or projections of the wheel C, and then, by pushing down on the outer end of the lever, its inner end $e$ will lock against the projection, and thus connect the wheel C and lever D rigidly together, the two then forming one lever, turning on the journal $o$ of the wheel as a fulcrum. As the wheel C is thus turned, its teeth on the opposite side will engage with the teeth on the bar B, and thus elevate it. To prevent the bar B from dropping back when released from the pressure of the lever, a pawl, E, is pivoted at $t$, on the rear part of frame A, with its upper end arranged to lock into the teeth on bar B, and act as a brace to hold it up. A spiral spring, $b$, serves to press the pawl E against the bar B, and a handle, $h$, below the journal $t$, serves to disengage the pawl from the rack-bar B, so as to permit the bar to be lowered when desired.

Having thus described my invention, what I claim is—

A lever-jack, consisting of the frame A, having the rack-bar B placed therein, and operated by means of the wheel C and the lever D, when said parts are arranged to operate as herein shown and described.

T. J. KINDLEBERGER.

Witnesses:
  L. C. ABBOTT,
  W. H. KINDLEBERGER.